US008031875B1

(12) United States Patent
Juels et al.

(10) Patent No.: US 8,031,875 B1
(45) Date of Patent: Oct. 4, 2011

(54) KEY DISTRIBUTION IN UNIDIRECTIONAL CHANNELS WITH APPLICATIONS TO RFID

(75) Inventors: Ari Juels, Brookline, MA (US); Bryan Parno, Pittsburgh, PA (US)

(73) Assignee: EMC Corporation, Hopkinton, MA (US)

( * ) Notice: Subject to any disclaimer, the term of this patent is extended or adjusted under 35 U.S.C. 154(b) by 667 days.

(21) Appl. No.: 12/188,686

(22) Filed: Aug. 8, 2008

Related U.S. Application Data (60) Provisional application No. 60/964,110, filed on Aug. 9, 2007.

(51) Int. Cl.
*H04L 9/00* (2006.01)
*H04L 9/08* (2006.01)
*G06Q 10/00* (2006.01)

(52) U.S. Cl. .................. 380/277; 380/278; 705/28
(58) Field of Classification Search .......... 380/277, 380/278; 705/28
See application file for complete search history.

(56) References Cited

U.S. PATENT DOCUMENTS

| 6,075,905 A | 6/2000 | Herman et al. |
| 6,363,485 B1 | 3/2002 | Adams et al. |
| 6,516,092 B1 | 2/2003 | Bachelder et al. |
| 6,862,687 B1 | 3/2005 | Suzuki |
| 7,602,904 B2 | 10/2009 | Juels et al. |
| 2006/0123241 A1 | 6/2006 | Martinian et al. |
| 2007/0011464 A1 | 1/2007 | Gorelik et al. |
| 2008/0238845 A1 | 10/2008 | Kanou |

OTHER PUBLICATIONS

M. Bellare and P. Rogaway, "Random Oracles are Practical: A Paradigm for Designing Efficient Protocols". In ACM CCS '93, 1993.
M. Bellare and P. Rogaway, "Robust Computational Secret Sharing and a Unified Account of Classical Secret-Sharing Goals". http://eprint.iacr.org/2006/449.pdf, 2007.
G. R. Blakley, "Safeguarding Cryptographic Keys", In AFIPS Conference Proceedings, vol. 48, pp. 313-317, 1979.
Davida, et al., "On enabling secure applications through off-line biometric identification", Security and Privacy, 1998. Proceedings., IEEE, 1998.
D. Boneh, X. Boyen, and E.-J. Goh, "Hierarchical Identity Based Encryption with Constant Size Ciphertext", In Advances in Cryptology: Proceedings of EUROCRYPT, vol. 3494 of Lecture Notes in Computer Science, pp. 440-456. Berlin: Springer-Verlag, 2005. Available at http://www.cs.stanford.edu/xb/eurocrypt05a/.
D. Boneh and M. Franklin, "Identity-Based Encryption from the Weil Pairing", SIAM Journal of Computing, 32 (3):586-615, 2003.
D. Boneh, C. Gentry, and B.Waters, "Collusion Resistant Broadcast Encryption with Short Ciphertexts and Private Keys", Advances in Cryptology: Proceedings of CRYPTO, 2005.
E. F. Brickell and D. R. Stinson, "Some Improved Bounds on the Information Rate of Perfect Secret Sharing Schemes", Journal of Cryptology, 5:153-166, 1992.

(Continued)

*Primary Examiner* — Philip Chea
(74) *Attorney, Agent, or Firm* — BainwoodHuang (57) ABSTRACT

A technique for securing information involves encrypting raw data into encrypted data based on an initial key. The technique further involves generating a set of key shares from the initial key via application of error correction code encoding. Each key share has a size which is independent of a size of the initial key. The technique further involves electronically storing each key share on a respective memory device of a set of memory devices (e.g., RFID tags). The initial key is reconstructable from a predetermined number of the key shares read from their respective memory devices to enable decryption of the encrypted data.

13 Claims, 6 Drawing Sheets

OTHER PUBLICATIONS

R. M. Capocelli, A. D. Santis, L. Gargano, and U. Vaccaro, "On the Size of Shares for Secret Sharing Schemes", Journal of Cryptology, 6:157-167, 1993.

Kilian, "Founding Cryptography on Oblivious Transfer", ACM, 1988.

H. Krawczyk, "Secret Sharing Made Short", In Advances in Cryptology: Proceedings of CRYPTO, pp. 136-146, New York, NY, USA, 1994. Springer-Verlag New York, Inc.

M. Langheinrich and R. Marti, "Practical Minimalist Cryptography for RFID Privacy". IEEE Systems Journal, vol. 1, No. 2, 2007.

R. J. McEliece and D. V. Sarwate, "On Sharing Secrets and Reed-Solomon Codes". Communications of the ACM, 24(9):583-584, 1981.

S. M. More, M. Malkin, J. Staddon, and D. Balfanz, "Sliding-Window Self-Healing Key Distribution", In Proceedings of the ACM workshop on Survivable and self-regenerative systems, pp. 82-90, New York, NY, USA, 2003. ACM Press.

W. Ogata and K. Kurosawa, "Some Basic Properties of General Nonperfect Secret Sharing Schemes". Journal of Universal Computer Science, 4(8), 1998.

A. Perrig, R. Canetti, J. D. Tygar, and D. Song, "The Tesla Broadcast Authentication Protocol". RSA CryptoBytes, 5(Summer), 2002.

Stern, "A New Identification Scheme Based on Syndrome Decoding", Springer-Verlag. 1998.

Juels, et al., "A Fuzzy Commitment Scheme", ACM, Oct. 1999, pp. 28-36.

I. S. Reed and G. Solomon, "Polynomial Codes Over Certain Finite Fields", Journal SIAM, 8:300-304, 1960.

P. Rogaway, M. M Bellare, J. Black and T. Krovetz, "OCB: A Block-Cipher Mode of Operation for Efficient Authenticated Encryption", ACM TISSEC, Sep. 2001.

A. Shamir, "How to Share a Secret", Communications of the ACM, 22(11):612-613, 1979.

M. Sudan, "Decoding of Reed-Solomon Codes Beyond the Error-Correction Bound", Journal of Complexity, 13(1): 180-193, 1997.

M. Sudan, "Maximum Likelihood Decoding of Reed Solomon Codes", 1996, IEEE Symposium on Foundations of Computer Science.

M. Sudan, "List Decoding: Algorithms and Applications", 2000, SIGACTN: SIGACT News (ACM Special Interest Group on Automata and Computability Theory).

M. Langheinrich and R. Marti, "RFID Privacy Using Spatially Distributed Shared Secrets", UCS, 2007 Proceedings of the 4th international conference on Ubiquitous computing systems.

KEY DISTRIBUTION IN UNIDIRECTIONAL CHANNELS WITH APPLICATIONS TO RFID

CROSS REFERENCE TO RELATED APPLICATIONS

This application claims the benefit of U.S. Provisional Patent Application No. 60/964,110 filed on Aug. 9, 2007, entitled "KEY DISTRIBUTION IN UNIDIRECTIONAL CHANNELS WITH APPLICATIONS TO RFID", the contents and teachings of which are hereby incorporated by reference in their entirety.

BACKGROUND

Secret sharing generally involves the distribution of a secret among a group of recipients using cryptographic methods. Each recipient typically obtains one or more shares of the secret. A share is information which is derived from the secret. Anyone with fewer than K shares (K being the threshold) is unable to reconstruct the secret. However, someone with at least K shares is able to reconstruct the secret from those shares.

Perfect secret sharing (PSS) is a scheme in which an adversary in possession of fewer than K shares learns no information about the secret in an information-theoretic sense, i.e., even if the adversary has unbounded computational resources. For PSS, the size of the share depends on the size of the underlying secret. In particular, the size of every participant's share must be at least that of the secret itself. Various PSS schemes are described the following publications: E. F. Brickell and D. R. Stinson, "Some improved bounds on the information rate of perfect secret sharing schemes", Journal of Cryptology, 5:153-166, 1992; R. M. Capocelli, A. D. Santis, L. Gargano, and U. Vaccaro, "On the size of shares for secret sharing schemes", Journal of Cryptology, 6:157-167, 1993; E. D. Karnin, J. W. Greene, and M. E. Hellman, "On secret sharing systems", IEEE Transactions on Information Theory, 29(1):35-41, 1983; and A. Shamir, "How to share a secret", Communications of the ACM, 22(11):612-613, 1979, the contents and teachings of which are hereby incorporated by reference in their entirety.

In the context of radio frequency identification (RFID) tags, one could apply a PSS scheme so that an RFID tag periodically emits a share of RFID tag information (i.e., the secret) in an attempt to conceal the RFID tag information from adversaries. Accordingly, a casual attacker with time-limited access to the RFID tag, and thus unable to obtain more than a few emissions, will be unable to reconstruct the RFID tag information. For a similar technique, see M. Langheinrich and R. Marti, "Practical minimalist cryptography for RFID privacy," In submission, 2007.

SUMMARY

Unfortunately, there are deficiencies to the above-described application of a PSS scheme to RFID tags. In particular, even though a reader in possession of fewer than K shares learns no information about the secret using the PSS scheme, security is still weak since a reader that probes the RFID tag over the course of several minutes could receive enough shares (i.e., K shares) to reconstruct the RFID tag information. Alternatively, an extension of the share emission period could cause undesirable delays for the authorized reader's ability to obtain the RFID tag information.

Furthermore, the use of a PSS scheme requires that the size of the share be at least the size of the secret. Unfortunately, amounts of memory within RFID tags are typically very small. Accordingly, storage of a share within an RFID tag could result in a sacrifice of storage of other valuable information on the tag.

Improvements are directed to techniques which involve encryption of data using an encryption key, and then secret sharing of that encryption key using error correction code (ECC) encoding. In particular, use of certain types of ECC encoding such as Reed-Solomon encoding is capable of providing extremely small shares (e.g., "tiny shares") but nevertheless delivers an acceptable level of information security, particularly when additional privacy is obtained by other means (e.g., share dispersion). In such a use, the size of the shares is no longer parametrically dependent on the size of the underlying secret and a share may now reveal partial information about the underlying secret (i.e., secret sharing is not perfect). Nevertheless, the reduction in the size of the shares (e.g., 8 bits) relative to the size of the underlying secret (e.g., an encryption key of 128 to 256 bits in length) is a tradeoff that may be worth making in many applications.

One embodiment is directed to a technique of securing information which involves encrypting raw data into encrypted data based on an initial key. The technique further involves generating a set of key shares from the initial key via application of error correction code encoding. Each key share has a size which is independent of a size of the initial key. The technique further involves electronically storing each key share on a respective memory device of a set of memory devices (e.g., RFID tags). The initial key is reconstructable from a predetermined number of the key shares read from their respective memory devices to enable decryption of the encrypted data.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves encryption of data using an encryption key, and then secret sharing of that encryption key using error correcting code (ECC) encoding. The use of certain types of ECC encoding such as Reed-Solomon encoding is capable of providing extremely small shares (e.g., "tiny shares") but nevertheless delivers an acceptable level of information security, particularly when additional privacy is obtained by other means (e.g., share dispersion). Under such use, the size of the shares is no longer parametrically dependent on the size of the underlying secret and a share may now reveal partial information about the underlying secret (i.e., secret sharing is not perfect). Nevertheless, the reduction in the size of the shares (e.g., 8 bits) relative to the size of the underlying secret (e.g., an encryption key of 128 to 256 bits in length) is a tradeoff that may be worth making in many applications.

Figure 1:
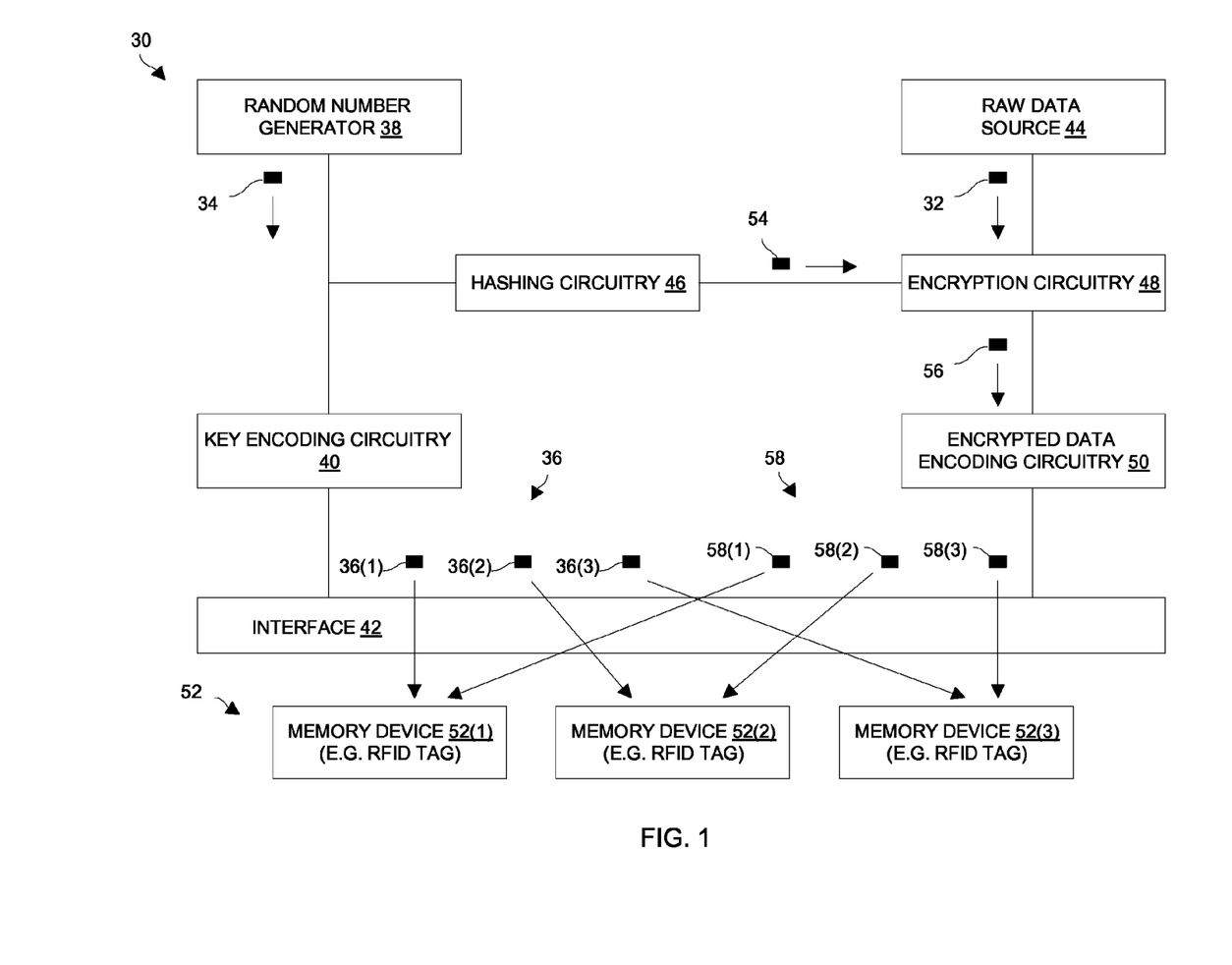
FIG. 1 is a block diagram of an example system which is constructed and arranged to provide a set of key shares based on an initial key.

FIG. 1 depicts an example system 30 which is constructed and arranged to encrypt raw data 32 based on an initial key 34, and then to provide a set of key shares 36 based on the initial key 34. As a result, both the raw data 32 and the initial key 34 are capable of being further handled and recovered in a secure and reliable manner. Further handling and recovering details will be provided shortly.

As shown in FIG. 1, the system 30 includes a random number generator 38, key encoding circuitry 40, an interface 42, a raw data source 44, hashing circuitry 46, encryption circuitry 48, and encrypted data encoding circuitry 50. Together, these components are constructed and arranged to provide and electronically store the set of key shares 36, perhaps with additional information, on a set of memory devices 52.

By way of example only, the system 30 outputs three key shares 36(1), 36(2), 36(3) (i.e., the total number of key shares 36 is three) for storage on three memory devices 52(1), 52(2), 52(3). Other numbers of key shares 36 and memory devices 52 are suitable for use as well.

During operation, the random number generator 38 outputs a random key 34 ($\kappa'$) which is input to both the hashing circuitry 46 and the key encoding circuitry 40. The hashing circuitry 46 derives a second key 54 ($\kappa$) from the random key 34 ($\kappa'$). In some arrangements, the random key 34 ($\kappa'$) is a 256-bit random number that is cryptographically hashed, using a hash function H($\kappa'$), to produce, as the second key 52 ($\kappa$), a 128-bit encryption key. In other arrangements, the hashing circuitry 46 does not apply a formal hashing function, but rather another unidirectional function U($\kappa'$), unidirectional function U having a property of non-invertibility. In other arrangements, hashing circuitry 46 is omitted, and random key 34 ($\kappa'$) is used as the encryption key ($\kappa$) 54.

The encryption circuitry 48 receives the raw data 32 from the raw data source 44 (e.g., a database or repository) and the second key 54 ($\kappa$) from the hashing circuitry 46, and encrypts the raw data 32 using the second key 54 ($\kappa$) to produce encrypted data 56. In particular, the encryption circuitry 48 encrypts the raw data 32 using the second key 54 according to a cryptographic algorithm $E_\kappa$, producing the encrypted data 56. There are a variety of well-known cryptographic algorithms E, which are suitable for use by the encryption circuitry 48.

The key encoding circuitry 40 executes an ECC encoding feature and generates the set of key shares 36 (e.g., three key shares, as depicted, but, more generally, N shares). The interface 42 then electronically stores the key shares 36 on respective memory devices 52. At this point, it should be understood that a user is capable of reconstructing the initial key 34 by electronically reading at least a predetermined minimum number K of the key shares 36 from the memory devices 52. However, a user with less than the predetermined minimum number K will not be able to reconstruct the initial key 34.

With reference to the encrypted data 56, the encrypted data encoding circuitry 50 executes an ECC encoding feature and generates the set of data shares 58. The interface 42 then electronically stores the data shares 58 on respective memory devices 52, which, in some embodiments, are radio frequency identification (RFID) tags. In some arrangements, the interface 42 electronically stores a key share 36 and a data share 58 onto a respective memory device 52 in a single write operation, concatenating the key share 36 and a data share 58 together.

In some embodiments, encrypted data encoding circuitry 50 is omitted, and the interface 42 electronically stores the encrypted data 56 on memory devices 52 without ECC sharing. In such embodiments, raw data 32 is segmented into units associated with each memory device 52 before encryption. Such an arrangement is well-suited for the case/item example of FIG. 5 below.

In other embodiments, no raw data 32 is provided at all, and interface 42 sends only the key shares 36 to respective memory devices 60. Such an arrangement is well-suited for the sliding window example of FIG. 6 below.

In some embodiments, system 30 (excluding the RFID tags 52 and perhaps raw data source 44) is contained within one node, such as a computer or another singular apparatus. In some embodiments, system 30 is implemented in software, stored in a tangible computer-readable medium and configured to execute on a computer. In other embodiments, system 30 is distributed among several different components residing in different housings. For example, key generation and distribution elements 38, 40, and 46 might reside in one location and/or housing, while data encoding elements 44, 48, and 50 might reside in another location and/or housing. Interface 42 might then reside in yet another location and/or housing.

Figure 2:
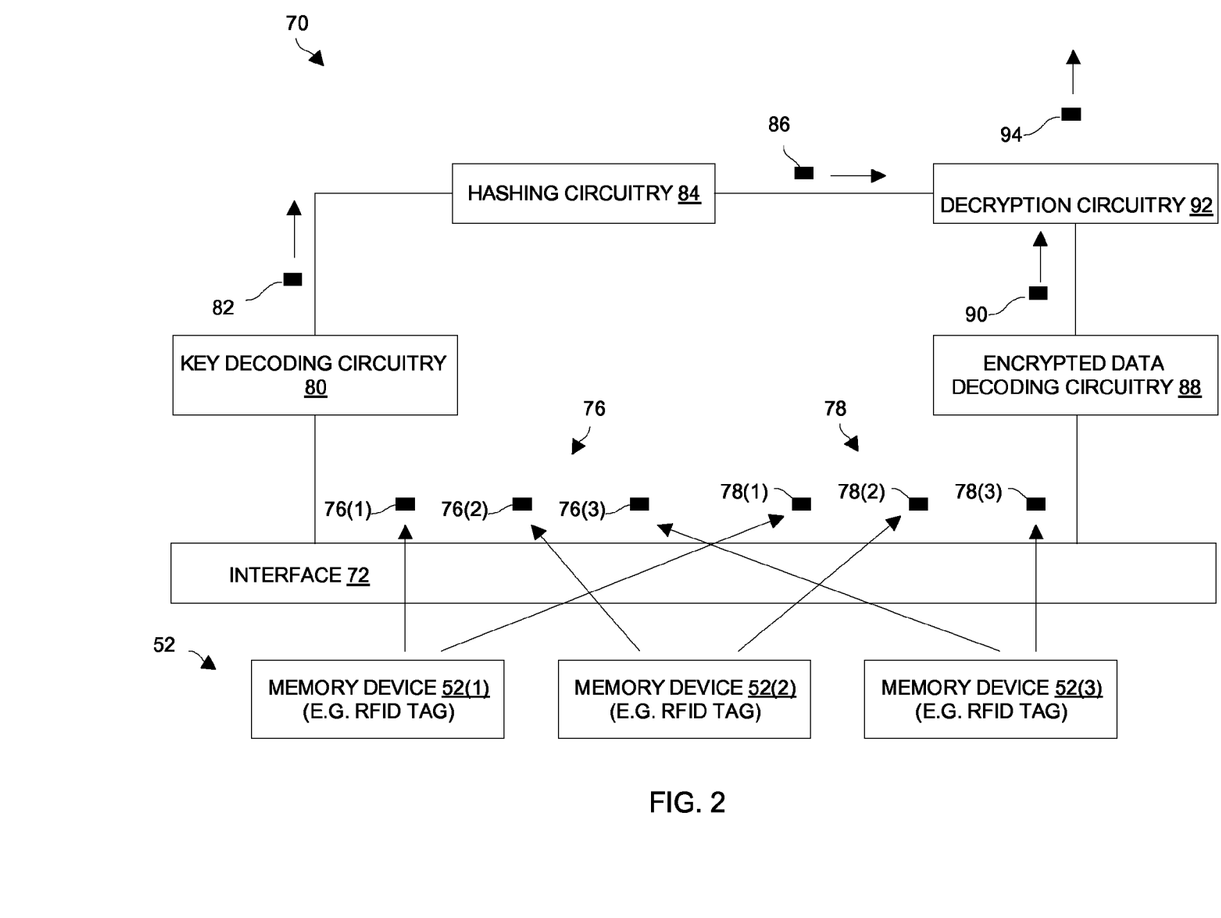
FIG. 2 is a block diagram of an example system which is constructed and arranged to reconstruct the initial key from a predetermined number of the key shares provided by the apparatus of FIG. 1.

FIG. 2 depicts an example system 70 which is constructed and arranged to reconstruct the initial key from a predetermined number of the key shares 52 provided by the apparatus of FIG. 1.

As shown in FIG. 2, the system 70 includes an interface 72 for reading respective key shares 76 and data shares 78 from memory devices 52. Key decoding circuitry 80 is configured to receive key shares 76 and decode reconstructed random key 82 ($\kappa'$). Reconstructed random key 82 ($\kappa'$) may be decoded if a sufficient number (predetermined minimum number K) of key shares 76 are available (from K memory devices 52).

Reconstructed random key 82 ($\kappa'$) is input into optional hashing circuitry 84 (which is similar to hashing circuitry 46 from FIG. 1), to produce reconstructed decryption key 86 ($\kappa$). Optional encrypted data decoding circuitry 88 is configured to receive data shares 78 and decode reconstructed encrypted data 90.

Decryption circuitry is constructed and arranged to receive reconstructed decryption key 86 ($\kappa$) and reconstructed encrypted data 90 and to produce decrypted raw data 94 by decrypting reconstructed encrypted data 90 with reconstructed decryption key 86 ($\kappa$).

In some embodiments, the data circuitry 88, 92 are omitted, the desired ultimate output of the system 70 being the reconstructed decryption key 86 ($\kappa$), or, when the hashing circuitry 84 is also omitted, the reconstructed random key 82 ($\kappa'$).

Figure 3:
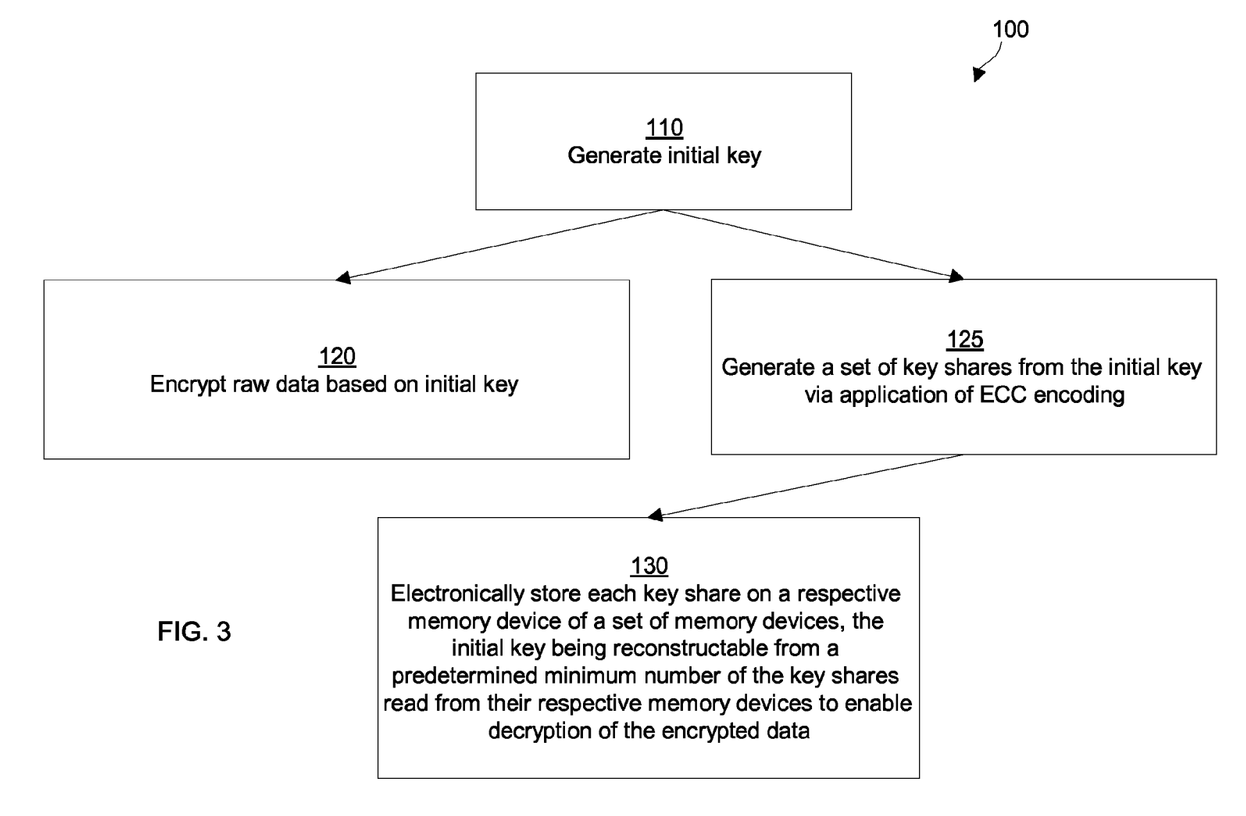
FIG. 3 is a flowchart of an example procedure which is performed by the system of FIG. 1.

FIG. 3 is a flowchart of a procedure 100 which is performed by the system of FIG. 1. In step 110, an initial key 34 ($\kappa'$) is generated by random number generator 38.

In step 120, encryption circuitry 48 encrypts raw data 32 based on the initial key 34 ($\kappa'$), producing encrypted data 56. In some embodiments, initial key 34 ($\kappa'$) is first transformed into encryption key 54 ($\kappa$) by hashing circuitry 46 as described above, and then encryption key 54 ($\kappa$) is used to perform the encryption.

In step 125, which may be performed simultaneously with step 120, key encoding circuitry 40 generates a set of key shares 36 from the initial key 34 (κ') using ECC encoding. In some embodiments, ECC encoding is an (N, K, D)$_Q$-ECC operation, in which N shares are generated such that at least K shares are needed to reconstruct the initial key for K≦N. If K<N, then the scheme is an imperfect secret sharing scheme (i.e., in an information theoretic sense, some information about initial key 34 is leaked in some situations where initial key 34 is not fully recoverable). ECC encoding operation operates over an alphabet Σ of size |Σ|=Q. D represents the minimum Hamming distance between shares. In this operation, $$D=N-K+1.$$

The maximum number of missing shares that still allow the initial key 34 (κ') to be computed is D−1. If some shares are corrupted, up to D/2 shares may be corrupted before initial key 34 (κ') is unrecoverable.

Each share may have a shorter bit-length $L_S$ than the bit-length L, of initial key 34 (κ'), so long as, at a minimum, $(L_S)(K) \geq L_κ$. Thus, for example, if initial key 34 (κ') is 240 bits long, and K=15, then $L_S$ must be at least 240/15=16 bits (encoding 65,536 possibilities). This may be referred to as "tiny secret sharing."

Continuing with the same example, if K=15, then the sharing algorithm is a (20, 15, 6)$_{65536}$-ECC operation. Up to 5 shares may be missing and the initial key 34 (κ') is still recoverable. Up to 3 shares may be corrupted and the initial key 34 (κ') is still recoverable (if all N shares are used).

In step 130, interface 42 electronically stores each key share 36 on a respective memory device 52(i) of a set of memory devices 52(1-N), the initial key 34 (κ') being reconstructable from the predetermined minimum number K of the key shares read from their respective memory devices 52 to enable decryption of the encrypted data 58.

Figure 4:
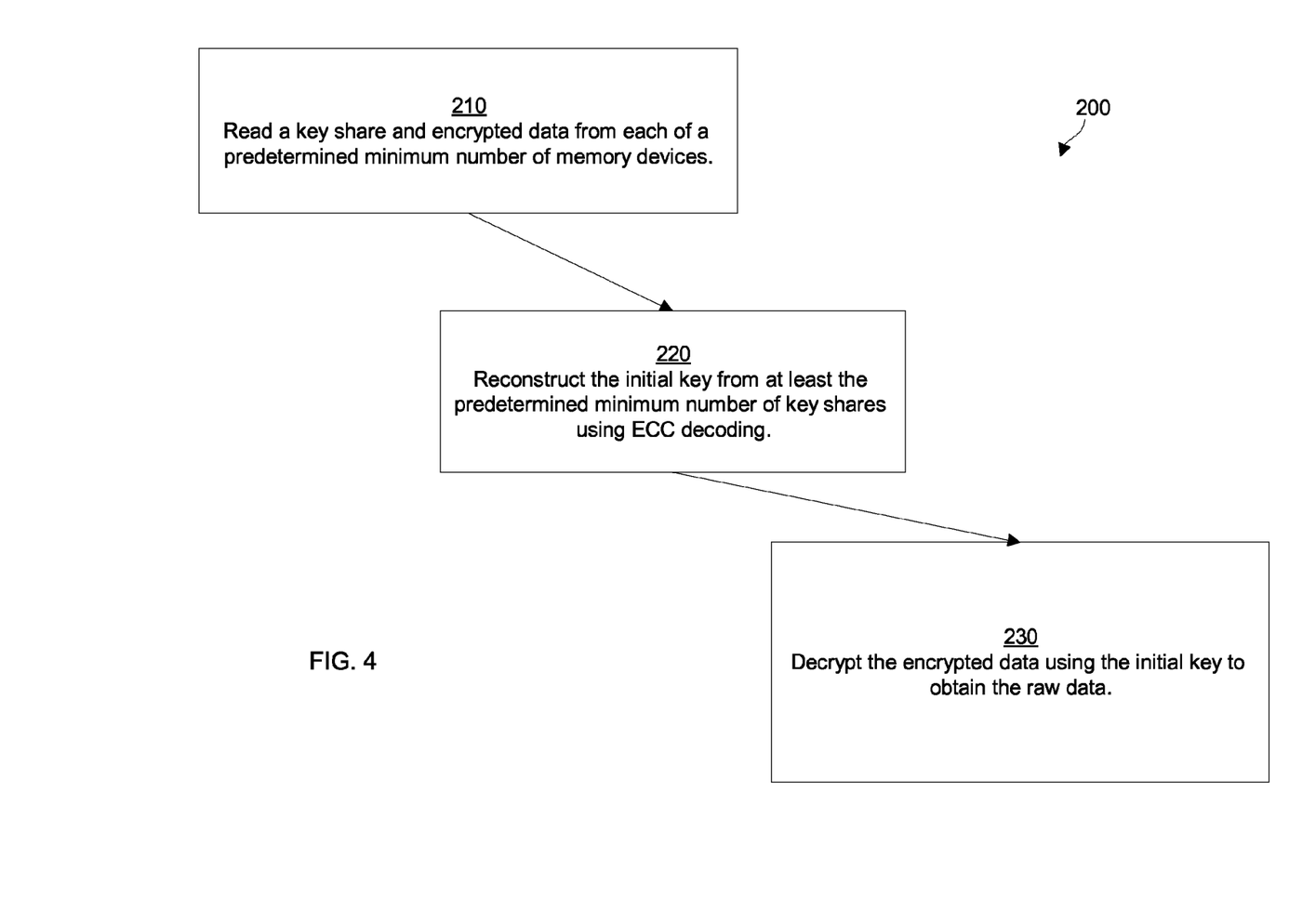
FIG. 4 is a flowchart of an example procedure which is performed by the system of FIG. 2.

FIG. 4 is a flowchart of a procedure 200 which is performed by the system of FIG. 2. In step 210, interface 72 reads a key share 76(i) and encrypted data 78(i) from each of the predetermined minimum number K of memory devices 52(i).

In step 220, key decoding circuitry 80 reconstructs the initial key 82 (κ') from at least the predetermined minimum number K of key shares 76 using ECC decoding. If some of the key shares 76 are corrupted, additional key shares 76 beyond the predetermined minimum number K will be needed.

In step 230, decryption circuitry 92 decrypts the encrypted data 90 (which may have been read directly from a memory device 52, or in an alternative embodiment, may have been decoded from a set of data shares 78 by encrypted data decoding circuitry 88) using the initial key 82 (κ') to obtain the raw data. As described above, in some embodiments, reconstructed initial key 82 (κ') is fed into hashing circuitry 84 to produce reconstructed decryption key 86 (κ), which is then used for the decryption process.

Figure 5:
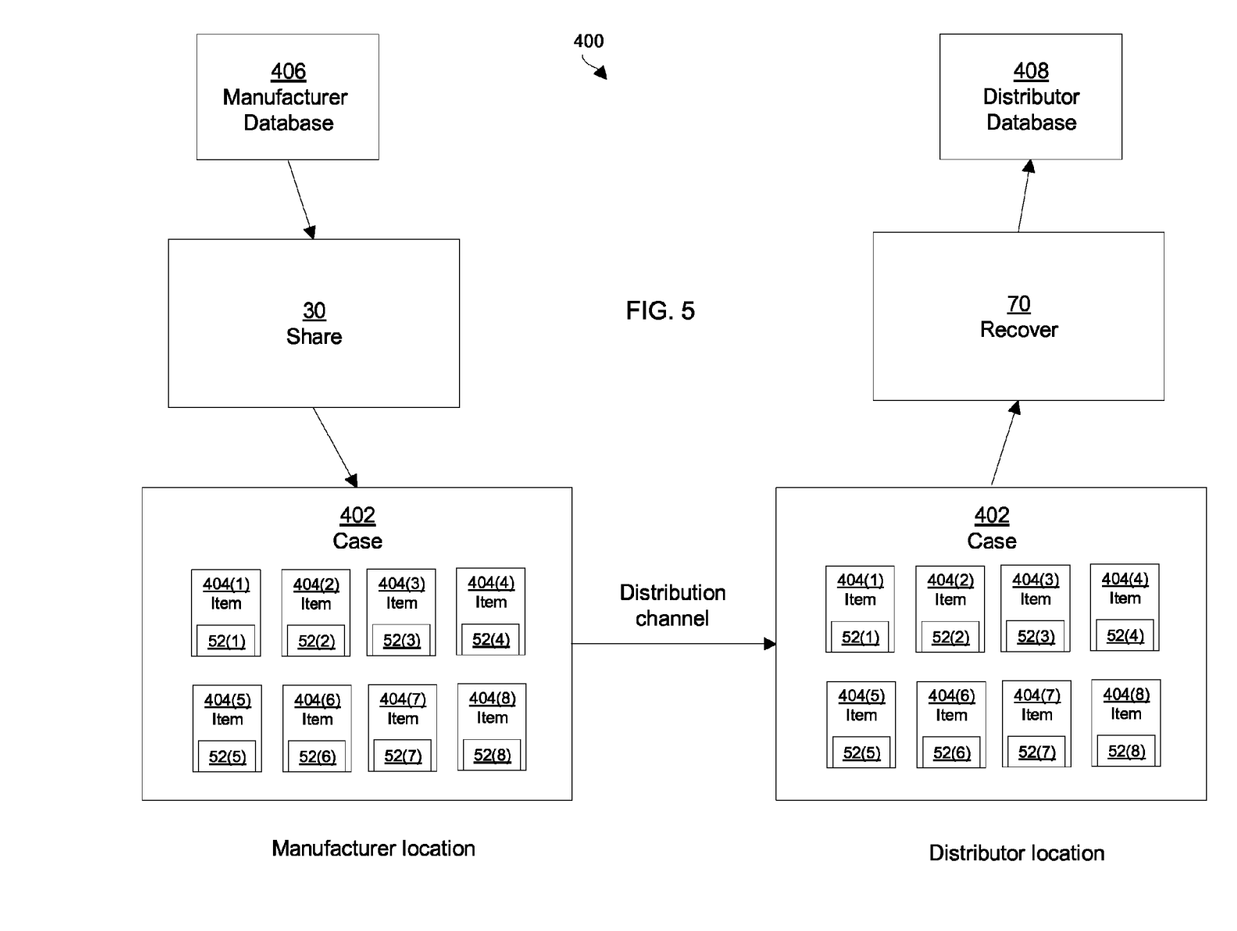
FIG. 5 is a block diagram of an example system for securing information which includes the systems of FIGS. 1 and 2.

FIG. 5 depicts an example system 400 for securing information which includes the systems of FIGS. 1 and 2. In one application, system 400 is utilized to secure RFID tags 52 for products shipped from a manufacturer to a distributor.

System 400 includes a manufacturer location, a distribution channel, and a distributor location. Manufacturer location includes at least one case 402. Case 402 includes a plurality of items 404 (e.g., bottles of prescription medicine)—in this case 8 such items 404(1-8). Each item has an RFID tag 52 affixed thereto. Each RFID tag 52 stores information about the item. The RFID tags 52 for each item are written by share system 30 (see FIG. 1 for further details about system 30).

In one embodiment, each RFID tag 52 stores manufacturer information, product information, and a serial number, the serial number indexing into a database 406 which stores detailed information about the particular item 404. For example, the RFID tags 52 each store a Class-1 Gen-2 standard Electronic Product code (EPC). The EPC has four fields: (1) a header, storing the EPC version number, (2) a domain manager, identifying the manufacturer, (3) an object class, specifying the product type, and (4) a serial number, uniquely identifying the particular item. Thus, RFID tag 52(1) might indicate:

(1) Header for GID-96
(2) PainReliever Pharmaceuticals, Inc.
(3) Oxycodone
(4) Serial number 1234567890.

Serial number 1234567890 indexes into database 406, where it might be noted that this item 404(1) contains 20 extended release pills of 10 mg each and was manufactured on Jul. 20, 2008, with an expiration date of Jul. 20, 2009.

In addition to storing the EPC, each RFID tag 52 might also store a key share (such as key share 36 from FIG. 1), the EPC code of each item 402 in the case 404 being encrypted with a key κ, derived from pre-key κ'. Since there are 8 items 404 in the case 402, pre-key κ' is distributed among the 8 items within the case according to, for example, a (8, 5, 4)$_{4294967296}$-ECC operation. If pre-key κ' is 160 bits (hashing to a 128-bit key κ), then each share might be 32 bits long with a minimum Hamming distance of 4 between shares.

Case 402 is distributed to a distributor (for example a local pharmacy) across a distribution channel. At the distributor location, case 402 is scanned by recover system 70 (see FIG. 2 for more details about system 70), and the recovered information is indexed into local distributor database 408, which may be in communication with manufacturer database 406 for synchronization. According to the (8, 5, 4)$_{4294967296}$-ECC example, at least 5 shares must be read by recover system 70 before pre-key κ' may be recovered (having pre-key κ' allowing key κ to be computed easily). Thus, even if system 70 is unable to read 3 of the RFID tags 52, the identity of the remaining products in the case may be determined, as described below. Alternatively, even if 2 of the RFID tags 52 become corrupted, if the remaining 6 RFID tags 52 are readable, then the identity of the remaining products in the case may be determined, as described below. Once key κ has been determined, the data 58 on each RFID tag 52 may be decrypted, revealing the EPC code for such RFID tag 52. According to this embodiment, the data 58 on each RFID tag 52 is not shared across the case 402, but rather each item 404 stores its own EPC code on its own RFID tag 52 (merely encrypted with shared key κ). Thus, the distributor is able to determine that item 404(1) is oxycodone from PainReliever Pharmaceuticals with serial number 1234567890. Indexing the serial number into the local database 408, the distributor is further able to determine that item 404(1) contains 20 extended release pills of 10 mg each and was manufactured on Jul. 20, 2008, with an expiration date of Jul. 20, 2009. The distributor might also update database 408 to indicate how many items of each type are in stock.

It should be noted that because each RFID tag 52 is encrypted, a malicious person with an RFID scanner would not be able to determine what kind of drug a customer who purchases item 404(1) is carrying.

In another embodiment, the EPC code on each RFID tag 52 might be unencrypted. In such an embodiment, once system 70 calculates key κ, that key κ may be used to generate a kill command. The kill command can be used to deactivate the RFID tag 52(1) on item 404(1) so that a malicious person with an RFID scanner would not be able to determine what kind of drug a customer who purchases item 404(1) is carrying. This is useful because oxycodone is a drug which is subject to considerable abuse, and it is often stolen by criminals.

In another embodiment, only a portion of the EPC code stored on an RFID tag 52 might be encrypted. Thus, the object class might be encrypted, while the other EPC fields are not encrypted. Thus, a malicious person with an RFID scanner would be able to determine that a customer carrying item 404(1) is carrying an item manufactured by PainReliever Pharmaceuticals with serial number 1234567890, but such malicious person would not know that item 404(1) is oxycodone, particularly if such person does not have access to databases 406, 408. In an alternative embodiment, both the object class and the serial number might be encrypted, while the domain manager remains unencrypted.

In another embodiment, chaff shares might be injected to thwart malicious snoopers. Given a case 402 holding 200 items 404, a $(200, 170, 31)_{65536}$-ECC scheme might be used. Thus, up to 30 RFID tags 52 can fail to be read (well more than the expected 2-3% failure rate often seen), or up to 15 RFID tags 52 may be corrupted and the remaining tags will still be decryptable. Given an item type which distributor is unlikely to put 170 on store shelves at once, a malicious snooper would not be able to determine κ. However, given another item type, distributor might place large numbers of items on store shelves at once. However, if items 404 from two different cases 402 are both placed on the shelves at once, items 404 from the second case will appear to be "corrupted" with respect to the first case, and vice versa. Thus, it is likely that more than 15 "corrupted" RFID tags would be read, permitting items 404 from neither case 402 to be snooped. In addition, chaff shares may be added. Since if more than D/2 shares are corrupted, then κ is hidden, D/3 chaff shares (with bogus key shares) may be placed in each case 402. Thus, in the $(200, 170, 31)_{65536}$-ECC example, if 10 chaff shares are placed in a case, even if 5 RFID tags 52 fail to register, κ will still be recoverable, but the chaff shares serve to make it more likely that the malicious snooper will not be able to recover κ. If 2 cases worth of material are placed out on store shelves, then there will be at 2D/3 chaff shares, ensuring that there are more than D/2 corrupted shares for either case, thwarting any malicious snooper.

Modifying the example, if instead of K=170, K=40, then a $(200, 40, 161)_{65536}$-ECC scheme could be used. In such an example, a malicious snooper would have an easier time snooping κ', but in some situations this may be tolerable (for example, when an average of only 10 items 404 are placed on store shelves at any time). Furthermore, such a scheme might be desirable if a large amount of read errors is expected.

It should be noted that key shares 36 need to be indexed into particular locations to be properly decoded using an ECC algorithm. This may be done by for each of the key shares, in the encoding process associating a respective index to that key share based on a unique RFID tag identifier and, in the decoding process using the key shares in conjunction with their associated respective indexes. The indexing may alternatively be done by hashing the encrypted data on each RFID tag 52.

Figure 6:
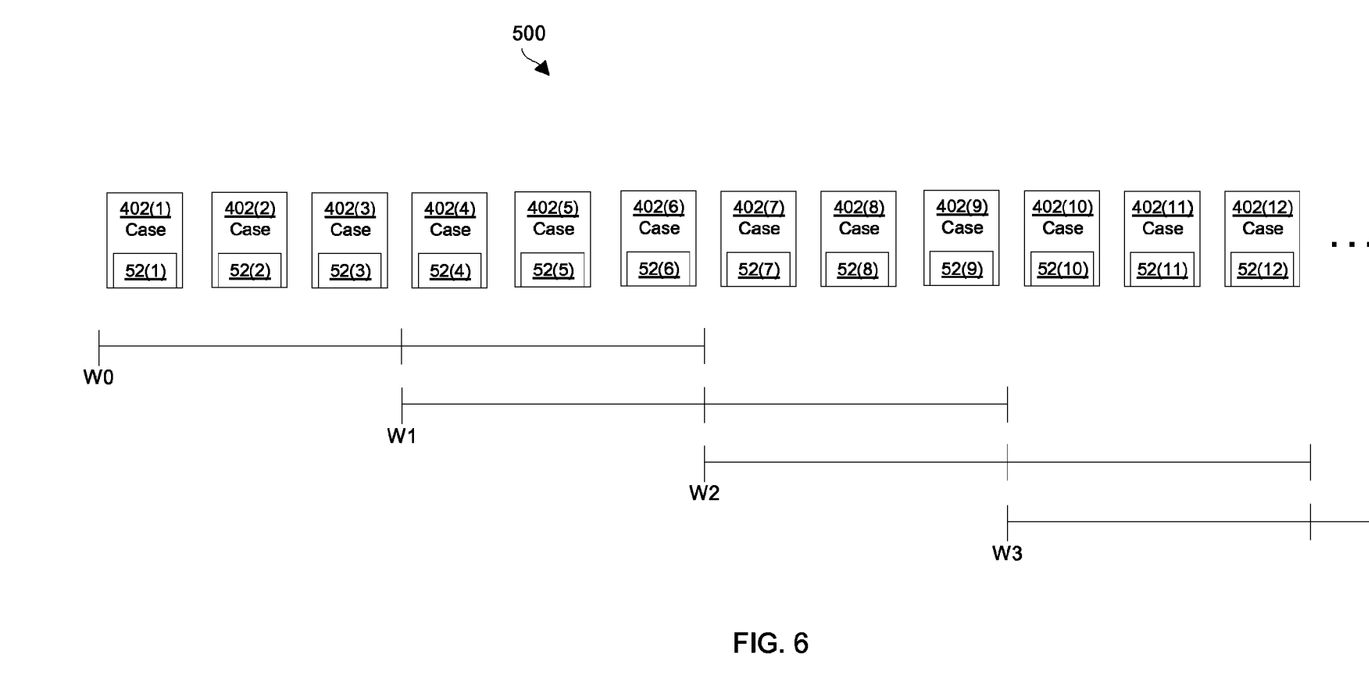
FIG. 6 is a block diagram illustrating a series of product shipments and a sliding window information secret sharing feature of the series.

FIG. 6 is a block diagram illustrating system 500, including a series of product shipments and a sliding window information secret sharing feature of the series.

In system 500, pre-key is shared across several cases 402 with an RFID tag 52 placed on each case. For example, window W0 includes cases 402(1-6), while window W1 includes cases 402(4-9). Within any given window, may be shared across the members of the window according to an ECC scheme similar to that described above. Thus, in one embodiment, a $(6, 4, 3)_\Gamma$-ECC scheme might be used (where $\Gamma=2^{256}$), in which any the RFID tags 52 of any 4 cases within the window are sufficient to decode κ'. If the manufacturer is careful never to ship more than 3 cases within any window together in the same truck (distribution channel), then even if one truck is intercepted by a malicious snooper, the malicious snooper will not be able to determine κ'.

It should be noted that, for example, windows W0 and W1 overlap. Thus, for example, RFID tag 52(5) on case 402(5) may be decrypted with either key $\kappa_0$ associated with window W0 or with key $\kappa_1$ associated with window W1. This is accomplished by using bilinear pairing, to avoid having to store two separate sets of encrypted data for each case 402. Thus, given a pre-key having a bit-length of 256 bits, only 384 bits are needed to store the key share 36 for each case 402.

While various embodiments of the invention have been particularly shown and described, it will be understood by those skilled in the art that various changes in form and details may be made therein without departing from the spirit and scope of the invention as defined by the appended claims.

For example, it should be understood that although various embodiments have been described as being methods, software embodying these methods is alternatively utilized in some embodiments. Thus, some embodiments include a tangible computer-readable medium (such as, for example, a hard disk, a floppy disk, an optical disk, computer memory, flash memory, etc.) programmed with instructions (i.e., storing instructions), which, when performed by a computer or a set of computers, cause one or more of the methods described in various embodiments to be performed. Another embodiment includes a computer which is programmed to perform one or more of the methods described in various embodiments.

As an additional example, it should be understood that although various embodiments have been described as using circuitry, software implementing the functions of the circuitry is alternatively utilized in some embodiments. Thus, some embodiments include a tangible computer-readable medium (such as, for example, a hard disk, a floppy disk, an optical disk, computer memory, flash memory, etc.) programmed with instructions (i.e., storing instructions), which, when performed by a computer or a set of computers, implement one or more of the functions of the circuitry described in various embodiments. Another embodiment includes a computer which is programmed to perform one or more of the functions of the circuitry described in various embodiments. Along those lines, it should be understood that the various circuitry in FIGS. 1 and 2 was illustrated as separated circuits in block diagram form to illustrate particular operations carried out by the systems 30, 70. Nevertheless, in accordance with certain arrangements, one or more circuits are implemented as a computer processor running software, or similar electronics which integrate one or more of the operations.

Furthermore, it should be understood that all embodiments which have been described may be combined in all possible combinations with each other, except to the extent that such combinations have been explicitly excluded. All such combinations are hereby explicitly taught.

What is claimed is:

1. A method of securing information, the method comprising:

encrypting raw data into encrypted data based on an initial key, the initial key having a key size;

generating a set of key shares from the initial key via application of error correcting code (ECC) encoding, each key share having a size which is independent of the key size;

electronically storing each key share on a respective memory device of a set of memory devices, the initial key being reconstructable from a predetermined minimum number of the key shares read from their respective memory devices to enable decryption of the encrypted data; and while electronically storing a particular key share on the respective memory device of that particular key share, electronically storing at least a portion of the encrypted data on the respective memory device;

wherein:
the set of electronic memory devices are radio frequency identification (RFID) tags;

electronically storing the particular key share and the encrypted data on the respective memory device includes writing the particular key share and the encrypted data to memory of a particular RFID tag;

each RFID tag is attached to a product;

encrypting the raw data into the encrypted data based on the initial key includes encrypting product data of the raw data, the product data indicating that the product belongs to a particular product class among multiple product classes; and the method further comprises:
reconstructing the initial key from at least the predetermined minimum number of the key shares;

decrypting the encrypted data using the initial key to obtain the raw data;

extracting the product data from the raw data to identify the particular product class to which the product belongs; and after extracting the product data from the raw data to identify the particular product class to which the product belongs, updating an inventory database based on the particular product class identified by the extracted product data.

2. A method as in claim 1 wherein each key share has a bit length which is shorter than that of the initial key.

3. A method as in claim 2 wherein each key share reveals partial information about the initial key in an imperfect secret-sharing manner.

4. A method as in claim 1, further comprising:
after reconstructing the initial key, dispersing the RFID tags to prevent further reconstruction of the initial key.

5. A method as in claim 4 wherein electronically storing each key share on the respective memory device of the set of memory devices is carried out at a first location; and
wherein reconstructing the initial key and dispersing the RFID tags is carried out at a second location which is substantially different than the first location.

6. A method as in claim 1 wherein reconstructing the initial key from at least the predetermined number of the key shares includes:
for each of the predetermined number of key shares, associating a respective index to that key share based on a unique RFID tag identifier; and
providing the initial key based on the predetermined minimum number of key shares and their associated respective indexes.

7. A method as in claim 1 wherein the set of key shares includes X key shares where X is a positive integer; and wherein reconstructing the initial key from at least the predetermined number of the key shares includes:

providing the initial key based on exactly Y key shares where Y is a positive integer which is less than X.

8. A method as in claim 1 wherein encrypting raw data into encrypted data based on the initial key includes:
deriving a key from a one-way function of the initial key; and
encrypting the raw data using the derived key, the derived key having shorter bit length than that of the initial key.

9. A method as in claim 1, further comprising:
electronically storing a chaff key share on at least one memory device of the set of memory devices, the chaff share to inhibit reconstruction of the initial key under an attempt to reconstruct the initial key using the chaff key share.

10. A method as in claim 1 wherein generating the set of key shares from the initial key via application of ECC encoding includes:
inputting the initial key into a Reed-Solomon ECC encoder circuit and reading an output of the encoder circuit.

11. A method of securing information, the method comprising:
encrypting raw data into encrypted data based on an initial key;
generating a set of key shares from the initial key via application of error correcting code (ECC) encoding, each key share revealing partial information about the initial key in an imperfect secret-sharing manner;
electronically storing each key share on a respective radio frequency identification (RFID) tag of a set of RFID tags, the initial key being reconstructable from a predetermined number of the key shares read from their respective RFID tags to enable decryption of the encrypted data; and
while electronically storing a particular key share on the respective RFID tag of that particular key share, electronically storing at least a portion of the encrypted data on the RFID tag;
wherein:
electronically storing the particular key share and the encrypted data on the respective RFID tag includes writing the particular key share and the encrypted data to memory of a particular RFID tag;
each RFID tag is attached to a product;
encrypting the raw data into the encrypted data based on the initial key includes encrypting product data of the raw data, the product data indicating that the product belongs to a particular product class among multiple product classes; and
the method further comprises:
reconstructing the initial key from at least the predetermined minimum number of the key shares;
decrypting the encrypted data using the initial key to obtain the raw data;
extracting the product data from the raw data to identify the particular product class to which the product belongs; and
after extracting the product data from the raw data to identify the particular product class to which the product belongs, updating an inventory database based on the particular product class identified by the extracted product data.

12. A method of securing information, the method comprising:
encrypting raw data into encrypted data based on an initial key;
generating a set of key shares from the initial key via application of error correcting code (ECC) encoding;

electronically storing each key share on a respective memory device of a set of memory devices, the initial key being reconstructable from a predetermined minimum number of the key shares read from their respective memory devices to enable decryption of the encrypted data;

transferring the set of memory devices from a first location to a second location in segregated groups, the second location being substantially different than the first location, and each group containing less than the predetermined minimum number of the key shares; and while electronically storing a particular key share on the respective memory device of that particular key share, electronically storing at least a portion of the encrypted data on the respective memory device;

wherein:

the set of electronic memory devices are radio frequency identification (RFID) tags;

electronically storing the particular key share and the encrypted data on the respective memory device includes writing the particular key share and the encrypted data to memory of a particular RFID tag;

each RFID tag is attached to a product;

encrypting the raw data into the encrypted data based on the initial key includes encrypting product data of the raw data, the product data indicating that the product belongs to a particular product class among multiple product classes; and the method further comprises:

reconstructing the initial key from at least the predetermined minimum number of the key shares;

decrypting the encrypted data using the initial key to obtain the raw data;

extracting the product data from the raw data to identify the particular product class to which the product belongs; and after extracting the product data from the raw data to identify the particular product class to which the product belongs, updating an inventory database based on the particular product class identified by the extracted product data.

13. A system for securing information, the system comprising:

encryption circuitry constructed and arranged to encrypt raw data into encrypted data based on an initial key, the initial key having a key size;

an encoder coupled to the encryption circuitry, the encoder being constructed and arranged to generate a set of key shares from the initial key via application of error correcting code (ECC) encoding, each key share having a size which is independent of the key size; and an interface coupled to the encoder, the interface being constructed and arranged to electronically store each key share on a respective memory device of a set of memory devices, the initial key being reconstructable from a predetermined minimum number of the key shares read from their respective memory devices to enable decryption of the encrypted data;

the interface, while electronically storing a particular key share on the respective memory device of that particular key share, being further constructed and arranged to electronically store at least a portion of the encrypted data on the respective memory device;

wherein:

the set of electronic memory devices are radio frequency identification (RFID) tags;

electronically storing the particular key share and the encrypted data on the respective memory device includes writing the particular key share and the encrypted data to memory of a particular RFID tag;

each RFID tag is attached to a product;

encrypting the raw data into the encrypted data based on the initial key includes encrypting product data of the raw data, the product data indicating that the product belongs to a particular product class among multiple product classes; and the system further comprises:

a decoder constructed and arranged to reconstruct the initial key from at least the predetermined minimum number of the key shares; and decryption circuitry coupled to the decoder, the decryption circuit being constructed and arranged to decrypt the encrypted data using the initial key to obtain the raw data; and additional circuitry constructed and arranged to:

extract the product data from the raw data to identify the particular product class to which the product belongs; and after extracting the product data from the raw data to identify the particular product class to which the product belongs, update an inventory database based on the particular product class identified by the extracted product data.

* * * * *